United States Patent
Bushnell et al.

(10) Patent No.: US 6,681,749 B2
(45) Date of Patent: Jan. 27, 2004

(54) VAPOR FUELED ENGINE

(76) Inventors: Raymond B. Bushnell, 25023 Beesen Rd., Beaver Creek, OR (US) 97004; Danny R. Lewis, 25023 Beesen Rd., Beaver Creek, OR (US) 97004

( * ) Notice: Subject to any disclaimer, the term of this patent is extended or adjusted under 35 U.S.C. 154(b) by 165 days.

(21) Appl. No.: 10/002,351

(22) Filed: Nov. 13, 2001

(65) Prior Publication Data

US 2003/0089347 A1 May 15, 2003

(51) Int. Cl.⁷ ................................ F02B 75/02

(52) U.S. Cl. ....................... 123/549; 123/557
(58) Field of Search ................ 123/549, 557, 123/543

(56) References Cited

U.S. PATENT DOCUMENTS

| | | |
|---|---|---|
| 3,442,632 A | 5/1969 | Mayland |
| 3,468,641 A | 9/1969 | Gross |
| 3,471,274 A | 10/1969 | Quigley |
| 3,572,297 A | 3/1971 | Murray |
| 3,799,124 A | 3/1974 | Swain |
| 3,897,757 A | 8/1975 | Abello |
| 3,963,000 A | 6/1976 | Kosaka |
| 3,995,421 A | 12/1976 | Kuroiwa |
| 3,995,600 A | 12/1976 | DeLuca |
| 4,016,837 A | 4/1977 | Wentworth |
| 4,079,703 A | 3/1978 | Yamane |
| 4,086,878 A | 5/1978 | Eisele |
| 4,112,875 A | 9/1978 | Laumann |
| 4,141,326 A | 2/1979 | Wolber |
| 4,181,100 A | 1/1980 | Yamane |
| 4,193,755 A | 3/1980 | Guarnaschelli |
| 4,274,383 A * | 6/1981 | Adams ................. 123/557 |
| 4,367,700 A * | 1/1983 | Pace ..................... 123/549 |
| 4,370,970 A * | 2/1983 | Kunz .................... 123/577 |
| 4,385,615 A * | 5/1983 | Keane ................... 123/557 |
| 4,389,981 A | 6/1983 | Meyer |
| 4,458,634 A | 7/1984 | Carr |
| 4,508,064 A | 4/1985 | Watanabe |
| 4,622,924 A | 11/1986 | Lewis |
| 4,953,514 A | 9/1990 | Beicht |
| 4,955,351 A | 9/1990 | Lewis |
| 5,085,176 A | 2/1992 | Brinkley |
| 5,088,452 A | 2/1992 | Iwaki |
| 5,092,281 A | 3/1992 | Iwaki |
| 5,115,768 A | 5/1992 | Peschka |
| 5,119,768 A | 6/1992 | Russell |
| 5,140,966 A * | 8/1992 | Wong ................... 123/543 |
| 5,178,118 A | 1/1993 | Nakamats |
| 5,183,011 A | 2/1993 | Fujii |
| 5,226,400 A | 7/1993 | Birch |
| 5,282,497 A | 2/1994 | Allison |
| 5,293,857 A | 3/1994 | Meyer |
| 5,359,968 A | 11/1994 | Shiraishi |
| 5,363,828 A | 11/1994 | Yamashita |
| 5,398,663 A * | 3/1995 | Kulasinghe ............ 123/549 |
| 5,438,961 A | 8/1995 | Peschka |
| 5,462,021 A | 10/1995 | Minami |
| 5,548,952 A | 8/1996 | Stock |
| 5,603,290 A | 2/1997 | Swain |
| 5,743,080 A | 4/1998 | Ginter |
| 5,752,157 A | 5/1998 | Yamashita |
| 5,765,538 A | 6/1998 | Krimmer |
| 5,816,223 A | 10/1998 | Jamrog |
| 5,832,718 A | 11/1998 | Suttrop |
| 5,890,472 A | 4/1999 | Saito |
| 5,899,188 A | 5/1999 | Firey |

(List continued on next page.)

*Primary Examiner*—Marguerite McMahon
(74) *Attorney, Agent, or Firm*—Robert L. Harrington; Schwabe Williamson & Wyatt

(57) ABSTRACT

A vapor fuel producing system for optimizing fuel efficiency including a vapor producing chamber, a controlled level of liquid fuel maintained in the chamber, agitation of the fuel to convert the liquid fuel to vapor, a temperature control for the fuel and thereby the fuel vapor, and a controlled input of ambient air to the fuel vapor to achieve a desired air to fuel mix throughout fuel demand of the engine, and conveyance of the mixture to the engine intake manifold.

1 Claim, 3 Drawing Sheets

U.S. PATENT DOCUMENTS

| | | |
|---|---|---|
| 5,934,260 A | 8/1999 | Gadkaree |
| 5,944,003 A | 8/1999 | Osanai |
| 5,946,916 A | 9/1999 | Ven |
| 5,979,418 A | 11/1999 | Saruwatari |
| 6,003,312 A | 12/1999 | Schlichtig |
| 6,015,133 A | 1/2000 | DeLand |
| 6,044,831 A | 4/2000 | Takagi |
| 6,053,153 A | 4/2000 | Moser |
| 6,067,966 A | 5/2000 | Saito |
| 6,076,355 A | 6/2000 | Ven et al. |
| 6,095,121 A | 8/2000 | Osanai |
| 6,116,221 A | 9/2000 | Matsumoto |
| 6,119,651 A | 9/2000 | Anderson |
| 6,138,644 A | 10/2000 | Saruwatari |
| 6,138,655 A | 10/2000 | Kerns |
| 6,155,239 A | 12/2000 | Dykstra |

* cited by examiner

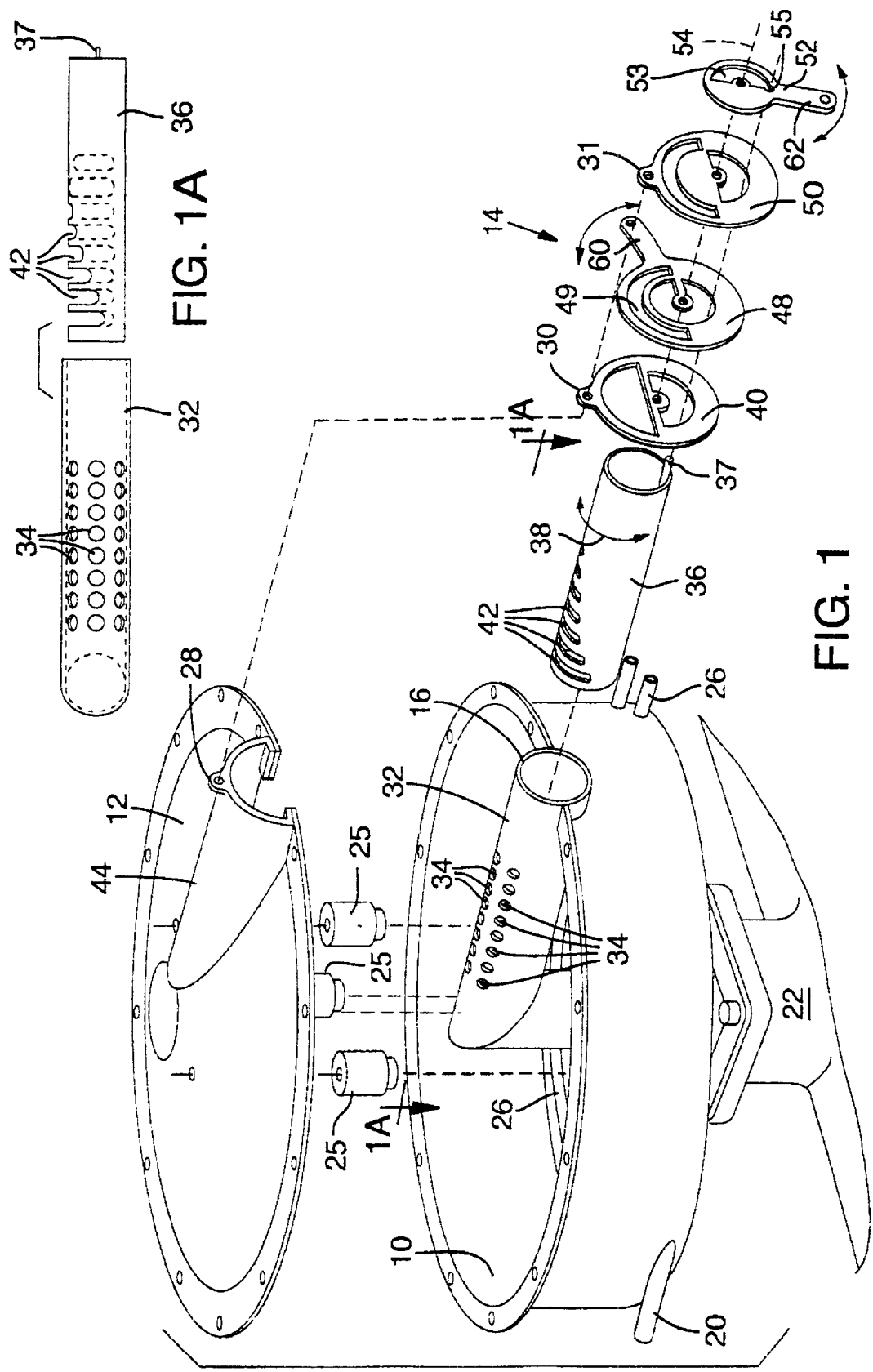

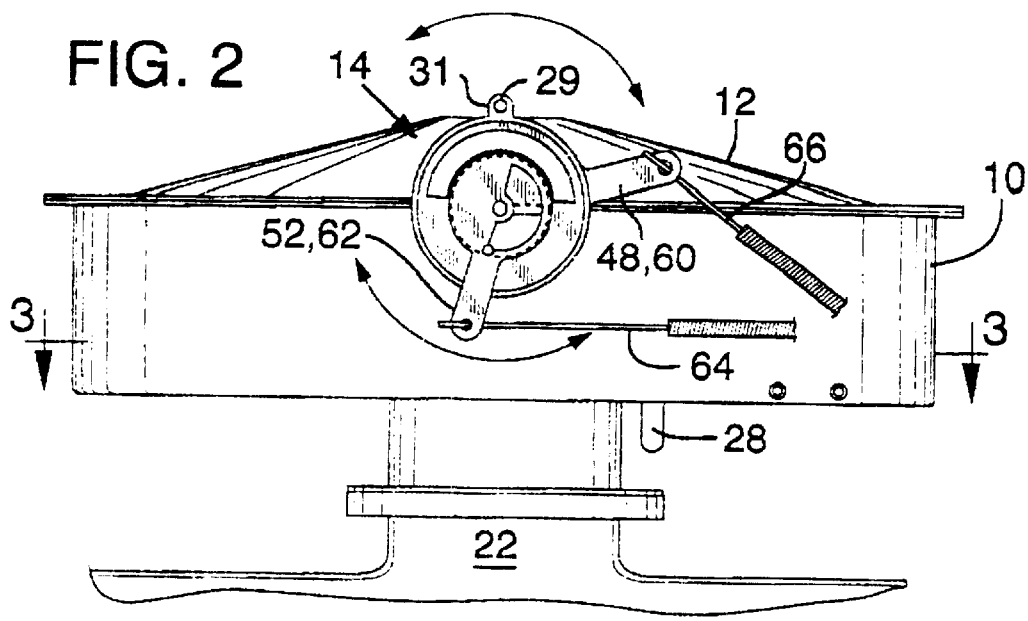
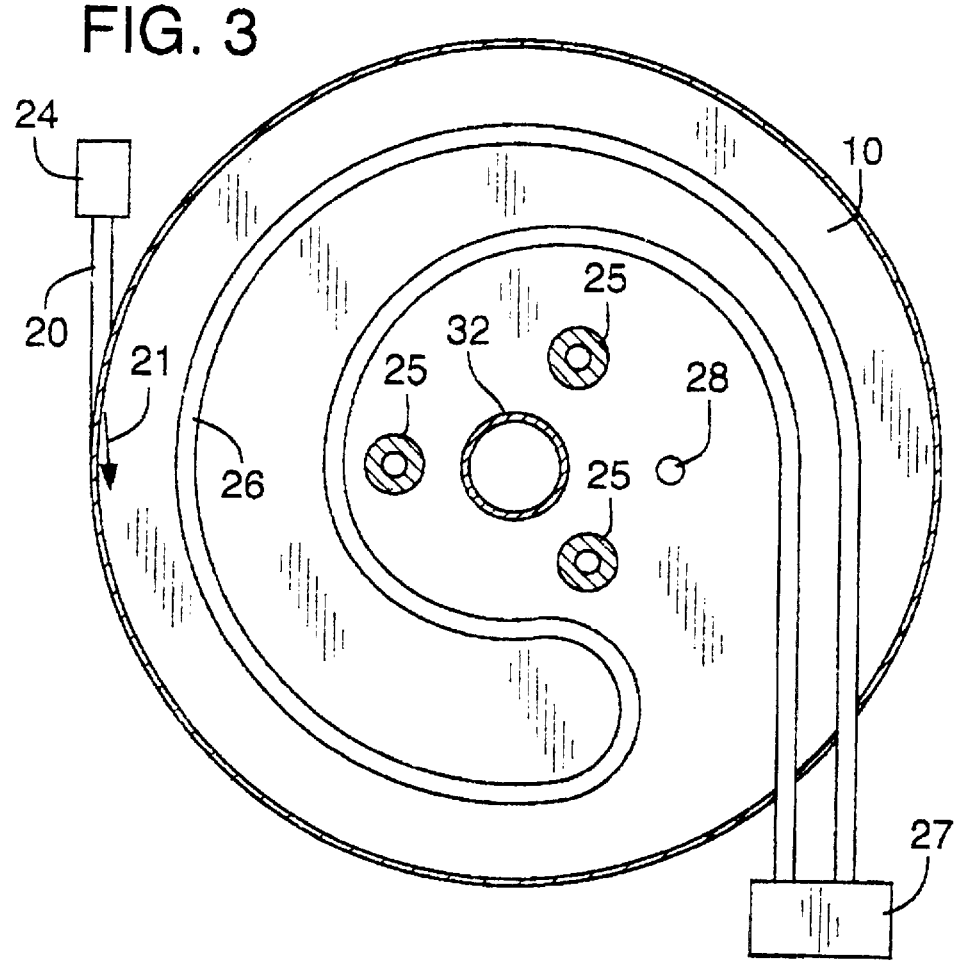

VAPOR FUELED ENGINE

FIELD OF THE INVENTION

This invention relates to an engine, e.g., for propelling a vehicle, wherein the fuel for powering the engine is provided in vapor form.

BACKGROUND OF THE INVENTION

Liquid fuel is known to be inefficient and there have been numerous attempts to utilize vaporized fuel as an alternative to liquid fuel. Many patents have been issued claiming benefits of vaporized fuel but liquid fuel remains the dominant form of fuel used for powering vehicle engines.

It is believed that a primary reason for the failure of vaporized fuel to function as an effective fuel for engines is the need to maintain a constant vapor composition matched to the particular engine and the vapor fuel varies in composition as a result of environmental variables. The present invention is directed to a means for controlling the variables to thereby provide the heretofore illusive benefit of vapor fuel efficiency.

BRIEF DESCRIPTION OF THE INVENTION

Increased fuel efficiency is achieved by the more complete burning of hydrocarbons and can be detected by measuring the hydrocarbons that are emitted as a waste product found in an engine's exhaust. The lower the hydrocarbon (parts per million), the more efficient the fuel utilization. It is an objective of this invention to reduce the hydrocarbons present in the exhaust to less than five parts per million and preferably down to one or zero parts per million.

Liquid fuel, e.g., gasoline, can be readily converted to vapor through agitation and/or heating. The vapor, however, must be delivered to the combustion chamber of a piston driven engine in a proper air fuel mixture to achieve the desired efficiency. In a particular engine, that mixture may be in the order of 26–30 parts air to one part fuel.

The problem is in the maintenance of the desired composition. For example, assuming that a desired mixture of air to fuel is 30 to 1, assume further that in a particular fuel vaporization set up, the vapor derived therefrom is in the order of five parts air to one part fuel. Vapor drawn from this source has to be modified by the addition of air to achieve the 30 to 1 ratio. The proper balance can be achieved through the addition of a calculated volume of ambient air. However, as soon as there is a change, e.g., in temperature, the vapor composition will change and the air input has to accordingly be changed to maintain the desired 30 to 1 ratio. These variables are addressed by the present invention as follows:

In a preferred embodiment, a vaporization chamber about the size of an air filter is provided, e.g., having a diameter of about 12 inches and a depth of about 3 inches but including a dome shaped roof. A liquid gas inlet which is connected from the vehicle fuel tank to the chamber delivers gasoline to the chamber. Open and shut valves are provided to maintain a liquid fuel depth of, e.g., ⅜ inch in the bottom of the chamber. An air mixing, vapor conveying pipe enters the chamber and exits the chamber, the exit portion of the pipe adapted to connect directly to the intake manifold of an engine. Valves are provided on the tube for controlled input of air from the atmosphere, and of vapor from the chamber, e.g., air being introduced at the inlet end of the pipe and vapor being introduced as the pipe traverses the chamber interior. Such valving is designed to cooperatively intermix the air and vapor in a given ratio regardless of the vacuum pull from the air intake manifold, i.e., to accommodate variations in engine/vehicle speed.

Additional to the above is a coil that is located in the liquid fuel in the bottom ⅜ inch of the chamber. The coil selectively provides heating or cooling of the liquid fuel. A temperature probe connected to the heating and cooling coil controls the heating and cooling of the liquid fuel and thus enables a set temperature for the fuel, e.g., at 75 degrees Fahrenheit.

Thus, regardless of the outside temperature or whatever factors exist in the surrounding media, the temperature of the liquid fuel being vaporized is maintained at 75 degrees F.

The vaporization chamber can be readily mounted on a conventional engine in minutes without exceeding available space within the engine compartment (under the hood). The gas line of the vehicle is connected into the chamber and the mixing pipe outlet is connected into the engine's intake manifold. A conventional heating/cooling control is connected to the heating/cooling coil and the vehicle is ready to run at a far superior efficiency using vaporized fuel.

The invention and its benefits will be more fully understood and appreciated upon reference to the following detailed description of a preferred embodiment having reference to the accompanying drawings.

DESCRIPTION OF THE DRAWINGS

FIG. 1 is an exploded isometric view of a vapor composition control apparatus in accordance with the present invention;

FIG. 1A is a view taken on view lines 1A—1A of FIG. 1 to illustrate the mixing pipe;

FIG. 2 is a side view of the assembled apparatus of FIG. 1;

FIG. 3 is a sectional view of the apparatus as taken on view lines 3—3 of FIG. 2;

DETAILED DESCRIPTION OF THE INVENTION

Figure 4:
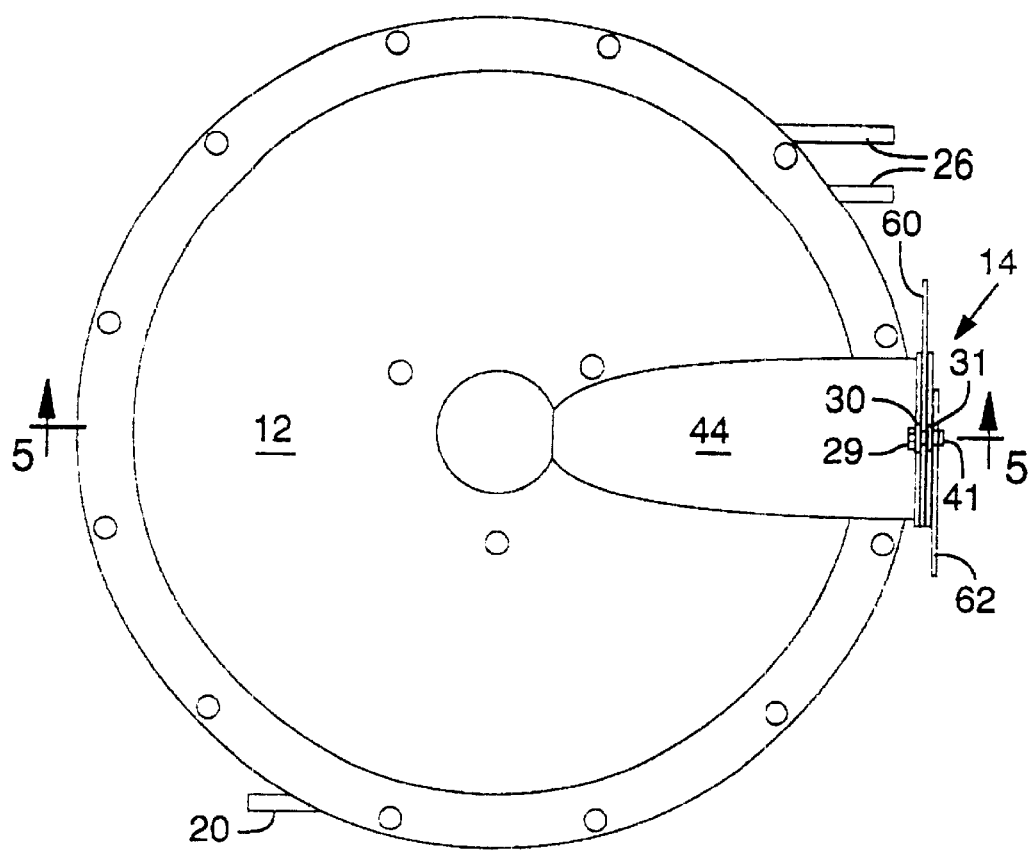
FIG. 4 is a top view of the apparatus of FIG. 2.
Figure 5:
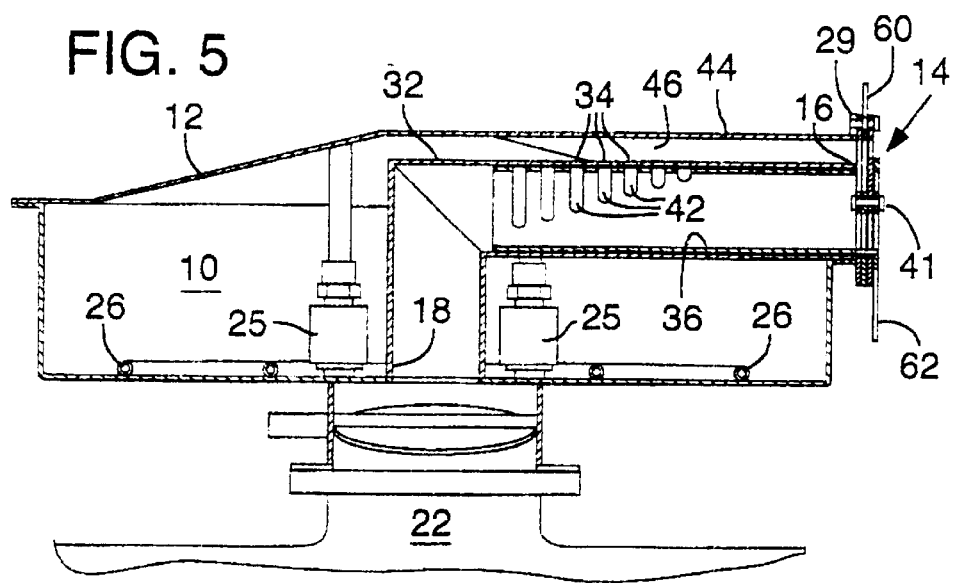
FIG. 5 is a sectional side view as taken on view lines 5—5 of FIG. 4.

With reference to the drawings, chamber 10 as illustrated in FIGS. 1, 3 and 5 is cylindrical having a diameter of about 12 inches and a height (not including dome 12) of about 3 inches. A mixing valve 14 is provided at an outboard end 16 of L pipe 32. L pipe 32 extends from the air inlet end 16 to the vapor fuel outlet end 18 (FIG. 5). The illustrated apparatus is intended to introduce a desired vapor fuel mixture directly into the intake manifold 22 and the otherwise conversion mechanism (e.g., the carburetor) of the vehicle between the fuel line 20 and the intake manifold 22 is replaced with chamber 10. Accordingly, the outlet end 18 is connected directly into the intake manifold as shown.

The chamber 10 is sealed except for the inlet and outlet openings as explained herein. Liquid fuel, e.g., gasoline, from fuel line 20 is directed into the chamber 10 as indicated by arrow 21 in FIG. 3. The liquid fuel is continuously under pressure to direct fuel into the chamber 10 and is controlled by fuel control module 24. Three floats 25 are electronically connected to control module 24 to maintain the level of liquid fuel in chamber 10 at a prescribed height, e.g., ⅜ inch. Thus at all times the liquid fuel level inside the chamber is constant. It is, however, considered beneficial for ideal agitation (and thus vaporization) of the fuel that the fuel be constantly circulated through the chamber and fuel outlet line 28 (FIGS. 2 and 3) is provided for this purpose.

Provided inside the chamber and preferably within the height of the liquid fuel level is heating and cooling coil 26. This coil is connected to a temperature control device 27 which is set to maintain the temperature of the liquid fuel in the chamber at a desired temperature, e.g., 75 degrees F. Quite simply, if the temperature of the liquid fuel falls below 75 degrees, the temperature control device 27 notes this discrepancy and the coil 26 heats the liquid fuel, and if the temperature exceeds 75 degrees, the coil 26 cools the liquid. Such control temperature devices are used for purposes such as controlling food product storage and the like and are readily available.

With the temperature of the liquid fuel at 75 degrees, the liquid fuel is rapidly vaporized and the remaining volume within the chamber (above the 3/8 inch depth of liquid fuel) is filled with vaporized fuel. The stabilization of this relationship is maintained by inherent pressure, that is, the chamber is sufficiently strong that if there is no outflow of the vaporized fuel, a pressure builds in the chamber and that pressure prevents further vaporization of the liquid fuel. It has been further determined that the chamber size (12 inches×3 inches with 3/8 inch liquid maintained at 75 degrees) generates sufficient vaporized fuel that a conventional vehicle engine that is run at highway speeds and when accelerating to highway speeds does not deplete the available vapor fuel in the chamber.

The conveyance of the desired mixture of vapor fuel and air is accomplished by the combination of L pipe 32 and scroll 36 shown assembled in FIG. 5 and in exploded view in FIG. 1. The conveying L pipe 32 has a horizontal leg that is provided with holes 34. A scroll 36 is inserted into the horizontal leg of pipe 32 and is rotatable relative to pipe 32 as indicated by arrow 38 in FIG. 1. Slits 42 are provided in the scroll 36 and the position of the slits 42 relative to the holes 34 of the pipe 32 are arranged whereby the slits 42 can be rotated to totally close the passages from the holes to the slits, or are positioned at any position to let minimum to maximum communication there between. Thus, fuel vapor in the upper section of the chamber 10 (adjacent dome 12) is transmitted controllably through alignment of slits 42 and holes 34 to the interior of the pipe 32 and thus in communication with the intake manifold 22.

Reference is now made to mixing valve 14 as illustrated in FIGS. 1, 2 and 5. As will be noted, the dome 12 is provided with a configured shroud 44 that overlies the pipe 32. As will be noted in FIG. 5, an air gap 46 is provided between the shroud 44 and pipe 32. Affixed to the end of shroud 44 via bolt 29 extended through tabs 30 and 31 is a first configured plate 40 which allows passage of air to both the air gap 46 and the interior of scroll 36. A bolt 41 (FIG. 5) passes through the centers of configured plates 40, 48, 50 and 52 to secure the plates together at their axes. Plates 40 and 50 are rotatably secured together (in non-rotation) via bolt 29 to fix the position of plate 50. Plate 48 is rotatable about the axis 54 of bolt 41 whereby its configured slot 49 opens and closes the passage of air into air gap 46. Plate 52 having openings 53 is rotated relative to plate 50 to open and close air flow into the scroll 36. Additionally, plate 52 is secured to the scroll 36 via pin 37 being inserted into hole 55 of scroll 36 to simultaneously rotate the scroll and increase or decrease the passage of vapor fuel through holes 34 and slits 42.

The Process

From the above, it will be understood that the valving components 14 are controlled by the rotative positioning of control plates 48 and 52 and these control plates are connected (connector 64, 66 in FIG. 2) to the engine throttle. (Note arms 60, 62 of plates 48 and 50 to facilitate the connection) Thus, as power is demanded of the engine via depression of the accelerator pedal, the plates 48 and 52 being connected to the accelerator pedal (mechanically as shown or electronically) will rotate the scroll 36 and the plate 48 to provide the increased volume of vapor/air mix to meet the vehicle fuel demands.

There is little variation in the air to vapor mix because the vapor component (fuel to air mix) is maintained constant. As long as there is a controlled consistent temperature maintained in the liquid fuel, the vapor component is substantially the same within the chamber 10 and consequently within the vapor drawn into the pipe 32 previously varied only by volume demand accommodated by the strategic opening and closing of the air inlets. Some variation may be experienced in the vapor composition within the chamber depending on the height above the liquid fuel level inside the chamber whereat the fuel vapor is drawn off and it has been determined that it is preferable to draw the vapor from the top of the chamber. The vapor composition is the lowest within or nearest the dome 12 and thus the valving ducts or ports are preferably located in the upper region of the chamber as shown.

It will be appreciated that a key to the efficiency of the above-described process is in the maintenance of the vapor composition emitted from the liquid fuel through the controlled temperature of the liquid fuel. Thus, once it is determined that fuel air mixture of the vapor produces the desired fuel efficiency (low or no carbohydrans lost through engine exhaust), that fuel air mixture needs to be maintained throughout the running of the engine. This is accomplished in the disclosed embodiment by (a) determining the desired fuel air mixture, (b) establishing air temperature control for the liquid fuel to be vaporized, (c) establishing the ambient air volume required for a given volume of the vaporized fuel, and (d) providing cooperative controls to insure the desired mix throughout the range of engine fuel demands.

It will be appreciated, however, that upon start up the temperature of the fuel in the chamber will be at ambient temperature. This is not a problem if the air temperature of the fuel is above the set temperature, i.e., above 75 degrees and the only result will be a somewhat less than efficient utilization of the fuel at start up. Should the temperature be below the desired temperature at start up and sufficiently below that temperature where the vapors are not sufficiently provided in the upper chamber volume to start the vehicle, it may be desirable to provide a heating mechanism much like that in use for starting diesel engines.

Those skilled in the art will conceive of many variations and modifications to accomplish the desired results based on the teachings of the above and such variations and modifications are anticipated by the terms used to define the invention. Accordingly, the terms are to be interpreted in their normal usage in the industry and particularly are not intended to be interpreted as means plus function elements.

The invention claimed is:

1. A system for producing fuel for a combustion engine comprising:

a chamber having a top, bottom and sides;

a fuel line connected into the chamber for inputting liquid fuel to the chamber;

a depth control module controlling the liquid fuel input to maintain the depth of the liquid fuel within the chamber;

a heating conduit immersed in the liquid fuel to maintain the liquid fuel at a desired temperature at which temperature the fuel emits vapors that fill an upper portion of the chamber;

a conveyance pipe that protrudes from the chamber interior to the chamber exterior through an outlet, and said pipe adapted for connection to an intake manifold of an engine;

and at least one mixing valve providing controlled transmission of air from the exterior of the chamber and into the interior of the pipe to be transmitted through the pipe, and providing controlled vapor input from the chamber into the pipe and the combination of air and vapor fuel providing a desired vapor fuel mixture to be conveyed to the intake manifold.

* * * * *